United States Patent [19]

Carr

[11] Patent Number: 4,910,500

[45] Date of Patent: Mar. 20, 1990

[54] ELECTRONIC CATTLE GROUP SYSTEM

[76] Inventor: Jay R. Carr, 2466 Fillmore Ct., Mesa, Ariz. 85205

[21] Appl. No.: 295,573

[22] Filed: Jan. 10, 1989

[51] Int. Cl.$^4$ ............ G08B 13/18; G08B 21/00; A01K 3/00

[52] U.S. Cl. .................... 340/573; 116/22 A; 119/29; 340/527; 340/556

[58] Field of Search ............ 340/573, 556, 309.15, 340/527, 533; 119/15, 15.5 R, 96, 29; 116/22 A

[56] References Cited

U.S. PATENT DOCUMENTS 3,611,363 10/1971 McCrea .................... 340/533
4,503,399 3/1985 Carr .................... 340/573
4,788,530 11/1988 Bernier .................... 340/527

Primary Examiner—Glen R. Swann, III
Attorney, Agent, or Firm—Fleit, Jacobson, Cohn, Price, Holman & Stern

[57] ABSTRACT

Livestock entering a border zone along a vehicle roadway are deterred by devices triggered into operation simultaneously with a remote alarm by interruption of photo-electric beams at ends of the zone from which the animals enter or exit. The deterring apparatus is reset to prevent operation in response to travel of a vehicle through the zone and is temporarily disabled by selective switch actuation.

4 Claims, 2 Drawing Sheets

ELECTRONIC CATTLE GROUP SYSTEM

BACKGROUND OF THE INVENTION

This invention relates in general to the control and monitoring of livestock or other animals and more particularly to a system for deterring animals from crossing a fenced border zone intersected by a vehicle roadway.

A system for detecting entry of animals into protected zones and monitoring movement therein by use of photo-electric light beams is already known, as disclosed in my prior U.S. Pat No. 4,503,399.

It is an important object of the present invention to provide a system of the foregoing type for detecting invasion of a predetermined deterrent zone, which is capable of distinguishing between moving automotive vehicles, horseback riders and slower moving animals so as to restrict operation of the system to a more desirable mode in deterring entry of animals into such zone.

An additional object is to provide a monitoring system associated with animal deterring apparatus by means of which entry of animals into a border zone produces an alarm remote from such zone.

SUMMARY OF THE INVENTION

In accordance with the present invention, sequential interruption of two radiation beams are detected in response to invasions of a deterrent border zone defined between such beams along a vehicle roadway. Animal deterring devices are triggered into operation simultaneously with a remote alarm to signify the presence of livestock in the border zone as well as other operational mode conditions of the system. The interval between sequential interruptions of different beams is timed to prevent operation and cause reset of the detrring devices only if the timed interval is less than a predetermined duration corresponding to travel of a vehicle through the zone above the lowest expected speed. Such animal deterring devices are alternatively disabled for a period of time in response to actuation of a switch to allow a horseman to traverse the border zone along the roadway without triggering the deterrent devices into operation.

BRIEF DESCRIPTION OF THE DRAWINGS

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Figure 1:
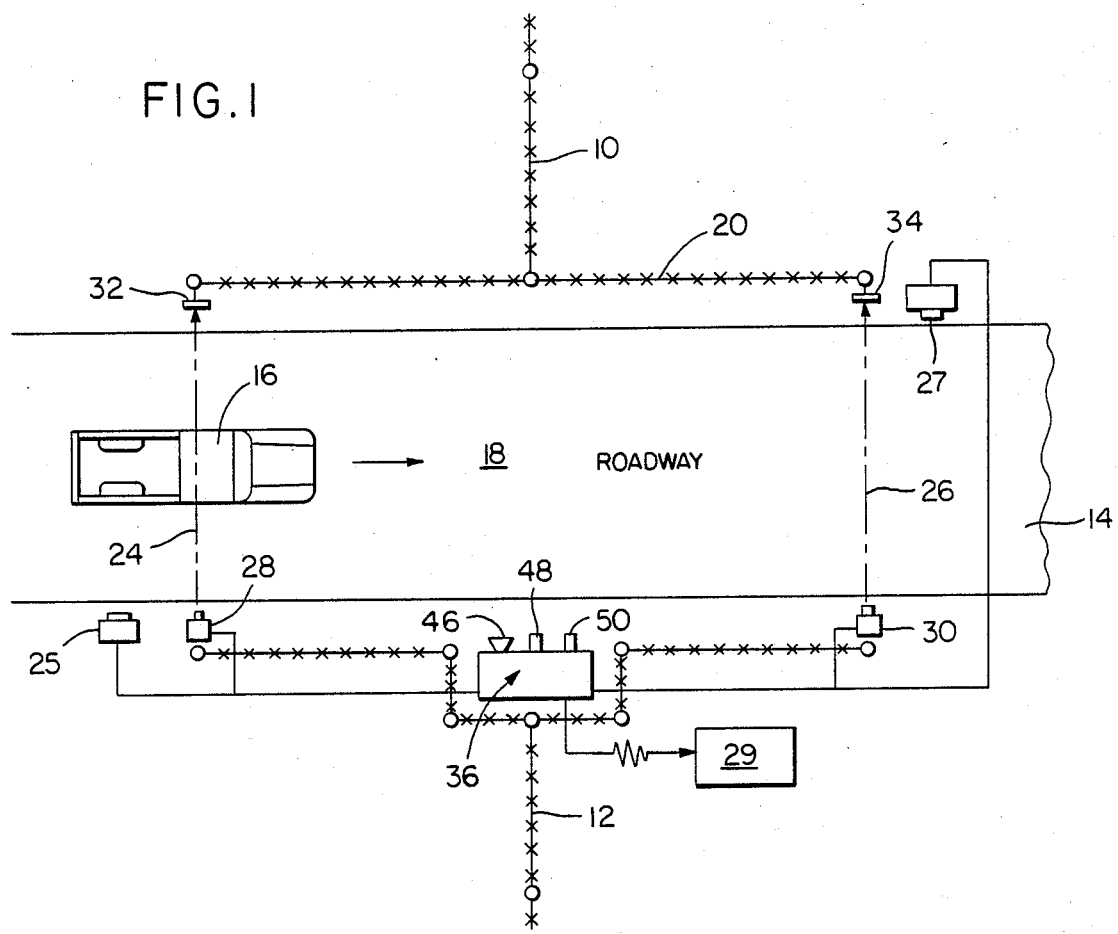
FIG. 1 is a simplified top plan view of an installational arrangement for the system of the present invention.

Referring now to the drawings in detail, FIG. 1 illustrates a typical environment for the present invention wherein a border between adjacent fields is established by sections 10 and 12 of a fence that is interrupted by an intersecting roadway 14 over which a vehicle 16 is adapted to travel. Livestock or other animals confined to ne side of the fence will eventually attempt to cross the border along the roadway 14. In order to discourage such crossing of the border, a deterrent zone 18 is established along a section of the roadway, in accordance with the present invention, between generally parallel fence sections 20 and 22 to which the border fence sections 10 and 12 are anchored. The ends of the deterrent zone 18 are defined by beams of radiation 24 and 26, such as light emitted from photo-electric emitter-receiver units 28 and 30 of well known construction and operation. Reflectors 32 and 34 are operatively positioned as shown to reflect the beams 24 and 26. The beams are interrupted by objects moving along the roadway, including the vehicle 16 and cattle attempting to cross the border. Push-button switch devices 25 and 27 are mounted along the roadway adjacent to the photo-electric units 28 and 30 and the beam reflectors 32 and 34 as shown.

Deterrent establishing apparatus generally referred to by reference numeral 36 in FIG. 1 is provided at a suitable location as shown to create conditions within zone 18 that will deter movement of livestock therethrough. The apparatus 36 will include electronic controls wired on the units 28 and 30, the switch devices 25 and 27 and a remote alarm device 29, located for example in a farm house dwelling.

Figure 2:
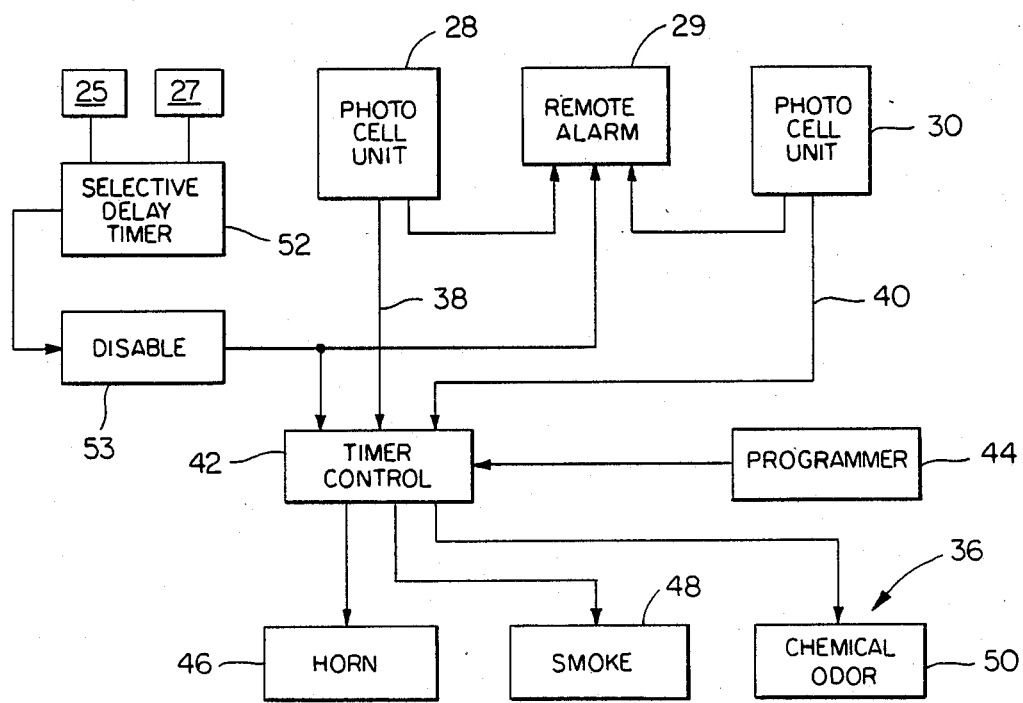
FIG. 2 is a schematic block diagram of the system.

As shown in FIG. 2, the units 28 and 30 are connected by signal lines 38 and 40 to a time delay control 42, the operation of which is dictated by a programmer 44 to activate a horn 46, a smoke generator 48 and a chemical odor emitting device 50 of the apparatus 36. The devices 46, 48 and 50 will accordingly produce deterring effects of increasing severity by respectively irritating the hearing, visual and smelling senses of livestock. A typical arrangement of the apparatus 36 is shown in my prior U.S. Pat. No. 4,503,399, aforementioned. The units 28 and 30 are also connected to the remote alarm device 29. The switch devices 25 and 27 are connected to a selective delay timer 52 which is thereby triggered into operation for preventing operation of the deterrent apparatus 36 for a predetermined delay period through a disabling control 53 connected to the timer control 42. During the delay period, a rider on a horse may traverse the border zone 18 without triggering operation of the apparatus 36.

Figure 3:
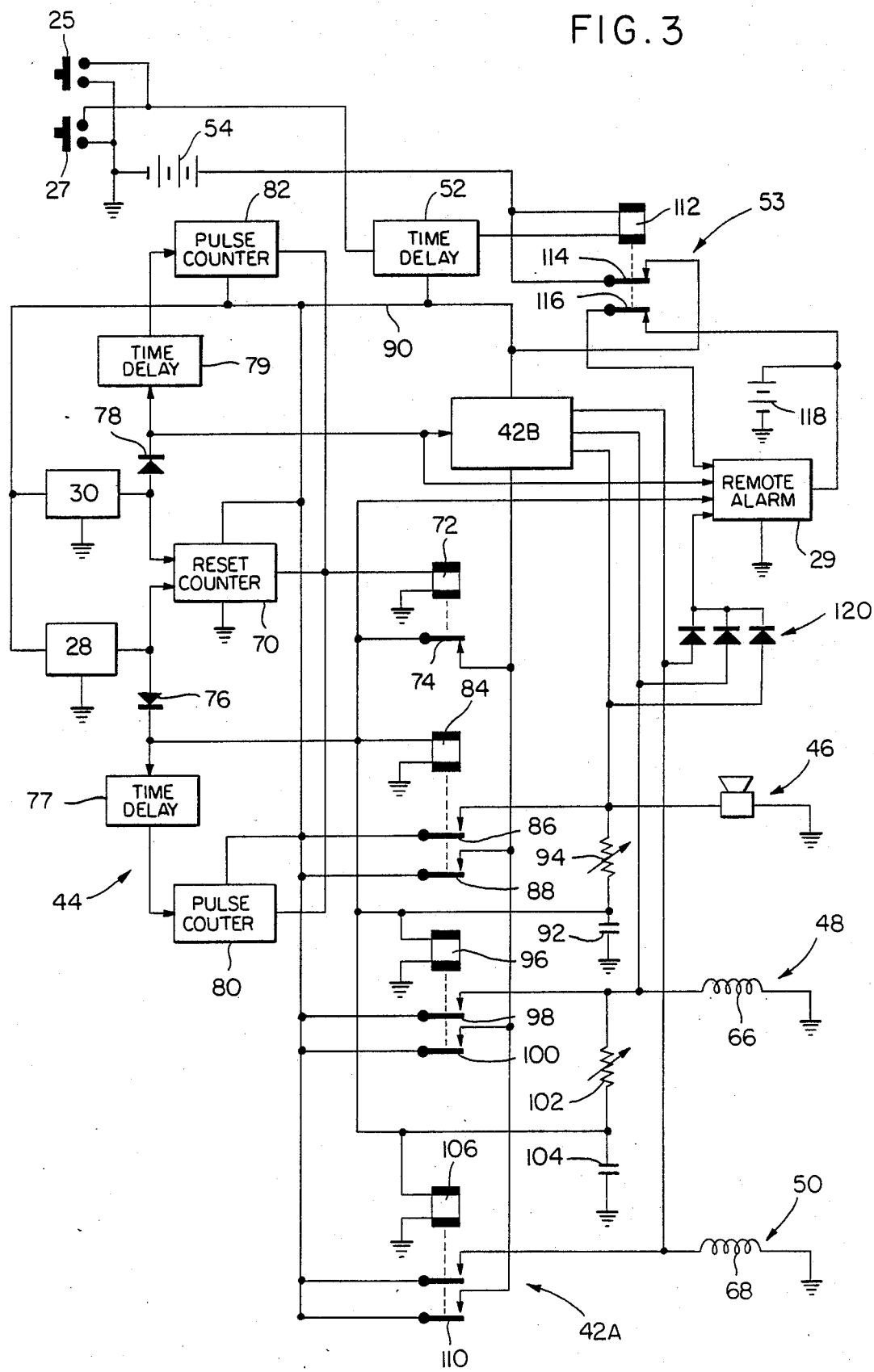
FIG. 3 is an electrical circuit diagram illustrating controls associated with the system.

FIG. 3 shows by way of example, one form of electrical circuit capable of carrying out the method of the present invention. The two photo-cell units 28 and 30 when energized produce output pulses in response to interruption of the associated beams 24 and 26, such pulses being fed to an electronic counter 70 in the programmer 44 through which the interval between two sequential interruptions of different beams are timed and produces an output pulse if the duration of the interval is less than a preset amount (corresponding to travel of a vehicle through zone 18 above the lowest expected speed, such as 10 MPH). The output of counter 70 is applied to a reset relay coil 72, having a normally closed reset switch 74. Pulse outputs of each unit 28 and 30 are also fed by diodes 76 and 78 though time delay circuits 77 and 79 to pulse counters 80 and 82 so that each second pulse of a sequence of spaced pulses produces an output to energize reset relay coil 72. Pulsing of the reset relay is operative through relay switch 74 to cancel operation of one or more of the aforementioned deterrent devices 46, 48 and 50 that are sequentially operated under control of the relay sections 42A and 42B of the control 42, respectively associated with each of the units 28 and 30.

Each of the relay sections 42A and 42B are similar in arrangement and operation. Relay section 42A, for example, includes a relay coil 84 connected by didde 76 to unit 28 so that a first pulse of a sequence produced by the first interruption of beam 24, pulses relay coil 84 to close its normally open horn switch 86 and close a relay holding switch 88. Relay switch 86 closed in response to the first interruption of beam 24, completes a circuit through the horn from battery power supply line 90 to energize the horn. Relay switch 88 being connected in series with normally closed reset switch 74, maintains relay coil 84 energized so as to continue operation of the horn until reset switch 74 is opened. When the horn 46 is energized by closing of relay switch 86, a timing capacitor 92 is charged through an adjustable resistor 94 to establish a first time delay period at the end of which relay coil 96 is energized to close its normally open relay switches 98 and 100. Relay switch 98 when closed energizes a valve solenoid 66 to operate the smoke generator 48, while closing of relay switch 100 maintains relay coil 96 energized to continue operation of the smoke generator. However, the occurrence of a second interruption of beam 24 before the end of the first time delay period energizes relay coil 84 by pulsing of relay coil 72 from counter 80 to open the reset switch 72. Thus, interruption of two different beams by a vehicle traveling through zone 18 cancels operation of the deterrent devices, whereas the interruption of one beam by slower moving animals initiates and continues operation of the horn 46 until the same beam is interrupted the second time as the animals retreat from the zone 18. If the animals do not retreat, after elapse of the first time delay period, the smoke generator 48 is triggered into operation and continues in operation until the elapse of a second time delay period following energization of the valve solenoid 66 of the smoke generator.

The second time delay period is determined by the setting of a second adjustable resistor 102 through which a second timing capacitor 104 is charged to a level sufficient to energize relay coil 106 at the end of the second time delay period. Energization of relay coil 106 closes its relay switch 108 to energize a valve solenoid 68 associated with the odor emitting device 50, and closes the relay holding switch 110 connected in series with reset switch 74 between the voltage line 90 and relay coil 106. Thus, the odor emitting device 50 is then operated until reset caused by a second interruption of the same beam.

In order to distinguish between retreating animals and following animals entering the deterrent zone to cause a second interruption of the same beam, time delays 77 and 79 cancel transmittal of a second pulse if it occurs within a delay interval of two seconds, for example, found to be suitable since it will no interfere with the reset effect of a moving vehicle which causes pulsing of relay coil 72 by counter 70. Such delay action of the second cancelling pulse to counter 80 and 82 will prevent unintended cancellation of the deterring action.

In most cases, the first deterrent produced by horn 46 is sufficient. However, the two additional deterrents provided by smoke generator 48 and odor emitting device 50 are available and are automatically triggered into operation in sequence as a graduated response to any hesitation on the part of animals to retreat from zone 18.

The disabling control 53, as shown by way of example in FIG. 3, includes a relay coil 112 having a pair of normally closed relay switches 114 and 116 associated therewith. The relay switch 112 is normally open and connected to a local power supply 118 through which the remote alarm device 29 is energized. Relay switch 114 on the other hand, is normally closed to connect the battery 54 to the power supply line 90. The relay coil 112 is connected in series with the delay timer 52 between the battery 54 and parallel connected switches 25 and 27. Closing of either one of the switches 25 and 27 will accordingly complete a circuit to ground in order to initiate a timing cycle in the timer 52 of predetermined duration during which he relay coil 112 is energized to open its relay switch 114 and close relay switch 116. Opening of relay switch 114 will disconnect the battery 54 from power line 90 to disable all components connected thereto, including apparatus 36 through the counters 82, 70 and 80 and the timer control 42. Relay switch 116 is closed at the same time to apply voltage to one input of the remote alarm device 29 from local battery 118 signifying actuation of one of the switches 25 and 27.

Two other inputs of the remote alarm device 29 are respectively connected through the diodes 76 and 78 to the outputs of the detection units 28 and 30 so as to register a remote alarm each time either of the light beams 24 and 26 is interrupted. A fourth input of the remote alarm device 29 is connected through diodes 120 to the inputs of the deterring devices 46, 48 and 50 as shown. Accordingly, the remote alarm 29 is capable of registering the operations of the deterring apparatus 36 as aforementioned to signify the presence of livestock in the border zone, as well as to register actuation of the switches 25 and 27 and detection of each beam interruption. Various operational modes of the system may thereby be registered through the remote alarm device 29 to monitor passage of vehicles or horsemen through the border zone as well as entry of livestock at a location remote from the border zone.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with apparatus for deterring movement of livestock through a border zone established between spaced beams of radiation and means for operating said deterring apparatus in response to sequential interruptions of said spaced beams timespaced from each other in excess of a predetermined interval, a method of monitoring the border zone including the steps of: registering said operation of the deterring apparatus at a location remote from the border zone to signify entry of moving objects into the border zone; and registering detection of said interruptions of the beams at said remote location to signify passage of vehicles through the border zone during said predetermined interval.

2. The method of claim 1 including the steps of: selectively disabling the deterring apparatus at the border zone to prevent said operation thereof for a predetermined period of time and registering said selective disablement of the deterring apparatus at said remote location.

3. In combination with apparatus for deterring movement of objects through a border zone established between spaced beams of radiation and means for operating said deterring apparatus in response to sequential interruptions of said spaced beams time-spaced from each other in excess of a predetermined interval of time, a method of monitoring said border zone including the steps of: registering said operation of the deterring apparatus at a location remote from the border zone to signify entry of the objects into the border zone; selectively disabling the deterring apparatus at the border zone to prevent said operation thereof for a predetermined period of time; and registering said selective disablement of the deterring apparatus at said remote location.

4. In combination with apparatus for deterring movement of livestock through a border zone established between spaced beams of radiation and means for operating said deterring apparatus in response to sequential interruptions of said spaced beams time-spaced from each other in excess of a predetermined interval of time, a method of monitoring said border zone including the steps of: registering detection of said interruptions of the beams, selectively disabling the deterring apparatus at the border zone to prevent said operation thereof for a predetermined period of time, and registering said selective disablement of the deterring apparatus at said remote location.

* * * * *